United States Patent [19]

Stoy et al.

[11] Patent Number: 5,066,091
[45] Date of Patent: Nov. 19, 1991

[54] AMORPHOUS MEMORY POLYMER ALIGNMENT DEVICE WITH ACCESS MEANS

[75] Inventors: George P. Stoy, South Brunswick Township, Middlesex County, N.J.; Francis T. Delahanty, Newtown Township, Bucks County, Pa.; Vladimir A. Stoy, Princeton, N.J.

[73] Assignee: Kingston Technologies, Inc., Dayton, N.J.

[21] Appl. No.: 493,102

[22] Filed: Mar. 12, 1990

Related U.S. Application Data

[63] Continuation-in-part of Ser. No. 288,629, Dec. 22, 1988, Pat. No. 4,921,323.

[51] Int. Cl.$^5$ ............................................. G02B 6/36
[52] U.S. Cl. ............................... 385/98; 428/34.9; 385/96
[58] Field of Search ................. 428/34.9, 188, 913; 156/86, 158; 350/96.2, 96.21

[56] References Cited

U.S. PATENT DOCUMENTS

| | | | |
|---|---|---|---|
| 3,086,242 | 4/1963 | Cook et al. | 264/566 |
| 3,370,112 | 2/1968 | Wray | 264/22 |
| 4,168,192 | 9/1979 | Nyberg | 156/86 |
| 4,178,067 | 12/1979 | Johnson et al. | 350/96.21 |
| 4,179,320 | 12/1979 | Midgley et al. | 428/34.9 |
| 4,261,644 | 4/1981 | Giannaris | 350/96.21 |
| 4,352,542 | 10/1982 | Tydings | 350/96.21 |
| 4,374,881 | 2/1983 | Hamilton | 428/34.9 |
| 4,467,002 | 8/1984 | Crofts | 428/34.9 |
| 4,472,468 | 9/1984 | Tailor et al. | 156/86 |
| 4,489,217 | 12/1984 | Klopfer | 174/35 C |
| 4,597,632 | 7/1986 | Mallinson | 350/96.21 |
| 4,606,954 | 8/1986 | Rausing et al. | 428/34.9 |
| 4,707,388 | 11/1987 | Park et al. | 428/34.9 X |
| 4,725,117 | 2/1988 | Ellis | 350/96.2 |
| 4,804,733 | 2/1989 | Bataille | 428/34.9 |
| 4,816,326 | 3/1989 | Jones et al. | 428/34.9 |
| 4,865,892 | 9/1989 | Winfield et al. | 428/34.9 |
| 4,921,323 | 5/1990 | Delahanty et al. | 350/96.21 |

Primary Examiner—John D. Lee
Assistant Examiner—John Ngo
Attorney, Agent, or Firm—Kenneth P. Glynn

[57] ABSTRACT

The present invention is directed to a device and method for precise positioning, or alignment of two or more articles with respect to each other. The device comprises a Unistructural Mass of Inherent Memory Polymer with two or more internal cavities which have inherent shapes with at least one cross-sectional configuration which is congruent to a cross-sectional configuration shape of the said article(s) in the positioned or aligned position(s). The unistructural mass cavities have cross-sectional configurations which are the same or smaller than those corresponding to the positions of the articles. The unistructural mass also includes at least one separate access cavity. It is deformed such that the articles can be readily inserted into the corresponding cavities. Once the articles are inserted into their corresponding cavities, the inherent memory polymer is returned to its inherent shape by non-mechanical stimulus to force the articles into precisely defined position and inspectional or operational access to the article(s) at or near the alignment portions is available through the separate access hole.

63 Claims, 7 Drawing Sheets

FIG-6A
FIG-6B
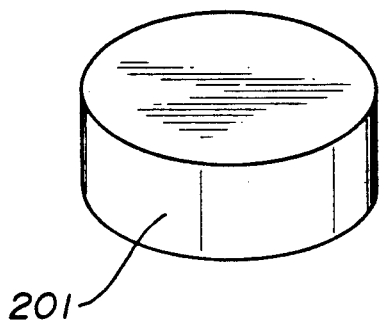
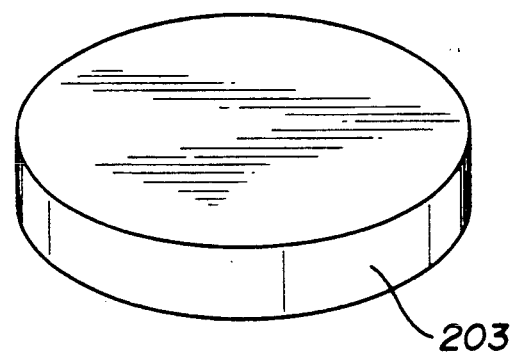
FIG-6C
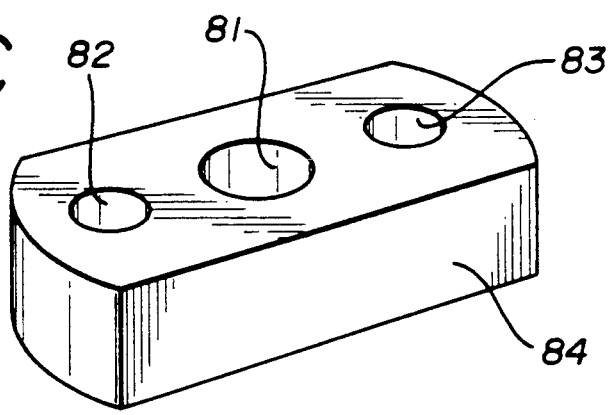
FIG-6D
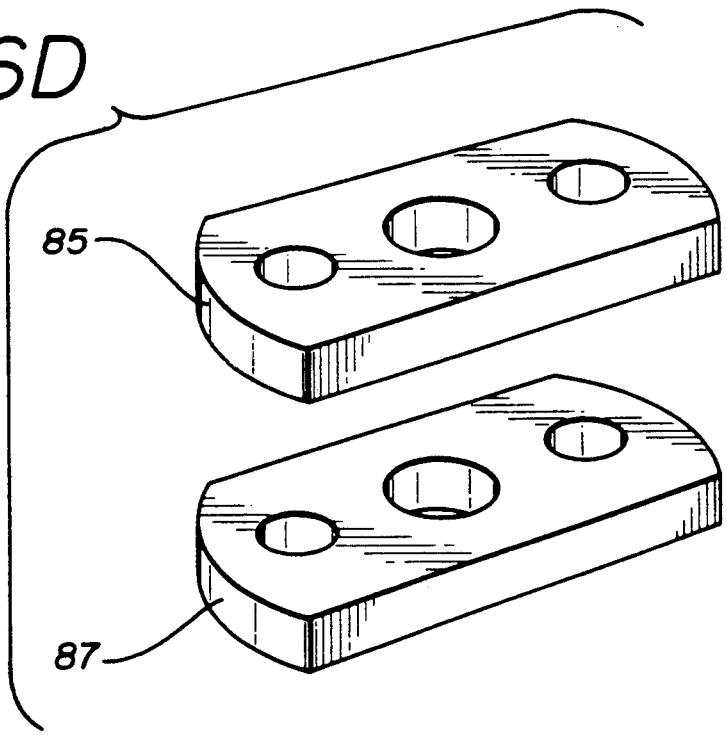

AMORPHOUS MEMORY POLYMER ALIGNMENT DEVICE WITH ACCESS MEANS

REFERENCE TO RELATED PATENT APPLICATIONS

This application is a continuation in part of co-pending U.S. application Ser. No. 07/288,629, filed on Dec. 22, 1988 by Francis Delahanty issued on 5/1/90, U.S. Pat. No. 4,921,323, Vladimir A. Stoy and Shiu-Bor Tong for "Memory Polymer Optical Fiber Splicer".

BACKGROUND OF THE INVENTION

Precise alignment of two parts of similar shape is needed in a number of situations.

For instance, two capillaries are aligned to secure the smooth through—flow of liquid; two optical fibers are aligned to secure transmission of light in communication cables; two tubes are aligned for precise coaxial welding; two electrical connectors are aligned to secure conduction between corresponding contacts, and so on. Such alignment is more difficult if the parts are very small and/or if the requirement on the precision of the alignment is very high.

The most precise alignment techniques were developed for splicing and connecting optical fibers. Thus, fiber-optics techniques are used herein for illustration of this problem and its state-of-the-art solutions, although it should be understood that this problem, as well as other applications of the present invention, is significantly broader in scope.

Splicing of optical fiber (that is, connecting the fiber ends permanently in a butt-to-butt fashion) is done in a number of ways. Splicing methods can be divided into several groups:

FUSING OR WELDING. Denuded ends of two fibers are aligned precisely under a stereo-microscope by X-Y-Z manipulators, and then welded together by a flame, arc or plasma. Such a manual alignment method is versatile but requires expensive equipment, time and considerable skill of the operator.

EMBEDDING IN CURABLE ADHESIVES. Fibers are aligned by mechanical contact with a precisely shaped solid surface, and then connected by a curable adhesive (such as a two-component epoxy glue). The aligning surfaces have various shapes: V-groove, star-shaped groove, arched groove, precise cylindrical hole, etc. Alignment is dependent upon the precise shape and surface quality of the rigid aligning surface.

DEFORMABLE ALIGNING/CLAMPING. Fibers are squeezed between deformable elements or clamps of various shapes and configurations. The deformation is caused by an external force. The elements may be from an elastomer, a deformable metal. etc. Such elements have a double function (aligning fibers and holding them together and both depend on the precision and surface quality of the element.

MEMORY MATERIAL SPLICERS containing the fiber ends in enlarged cavities which collapse upon heating so that their inner diameter is diminished below the fiber outside diameter. Various "heat shrinkable" materials can be employed, such as memory metals described in U.S. Pat. Nos. 4,261,644; 4,352,542 and 4,597,632 or British Patent No. 1,555,475; crystalline crosslinked polymers described for example in U.S. Pat. Nos. 3,086,242; 3,359,193; 3,370,112; 3,597,372; 3,616,363; 4,178,067; 4,489,217 and 4,725,117; or amorphous inherent memory polymers described for example in U.S. Pat. No. 4,731,079.

One can observe that the apparatus needed for aligning the fibers for fusing or welding is expensive and often requires laboratory conditions as well as the high skill of the operator.

Aligning mechanisms of the mechanical splices (whether using curable adhesives. deformable elements, or memory materials) require parts made with very high precision and thus, are inherently expensive. The alignment depends on the contact of the closest portion of the aligned parts ("ends") with some portion of the solid aligning surface. The alignment quality depends on the precision and quality of such a surface.

To decrease the extreme requirements on the surface quality, both parts are supported in close proximity to their contact points or areas by the same part of the surface so that the alignment is expected to be reasonably good even if the aligning surface is n<t absolutely precise on a larger scale.

The direct contact of the aligned ends with the aligning surface obstructs the access to the contact area between the aligned articles to various degrees. This complicates the application of coupling media or adhesives to the contact area. The devices which are the most efficient in aligning the fibers in a butt-to-butt fashion (such as the dry memory splicers described in the U.S. Pat. Nos. 07/288,628, 4,888,827) are the most difficult to use with coupling media and also leave the ends of the spliced fibers entirely inaccessible since the whole fiber circumference is in contact with the memory material.

Some connectors or splicers are equipped with thin channels allowing for the introduction of coupling media to the joint area. Such thin channels, however, are not sufficient to ensure the access to the joint to perform other operations since the major part of the joint area is still in direct contact with aligning surfaces.

Hence, current aligning mechanisms prevent any free access to the joint between the connected parts.

Barring the aforementioned X-Y-Z manipulators, there is no mechanism or device in the prior art which can align two parts with high precision by simple and inexpensive means and leave the joint between the parts accessible for inspection, cleaning, welding, gluing, fusing, or any other operation.

SUMMARY OF THE INVENTION

Apparatus and method according to our invention is designed for precise positioning and/or alignment of one or more articles with respect to the apparatus. In alignment involving two or more articles, if two or more articles of the same, similar or dissimilar shape are aligned with respect to the apparatus, they are also connected and aligned and/or precisely positioned with respect to each other.

Connected articles are fixed with respect to at least some degree of freedom. They can be either in mutually fixed position or they can be in aligned position but free to move with respect to some of the degrees of freedom (translation along the axis of alignment, rotation of symmetrical articles about such axis, etc.). This describes in general the connection or alignment for various practical jobs where precise mutual positioning of two or more articles is important, such as: connecting or splicing optical fibers; connecting tubes for fluid transport; positioning of articles for machining or assembly;

contacting electrical connectors; aligning optical elements and so on.

The alignment device according to our invention comprises a Unistructural Mass of Inherent Memory Polymer (IMP) with two or more internal cavities which have inherent stapes with at least one cross-sectional configuration which is congruent to a cross-sectional configuration shape of the to-be-aligned article(s in the positioned, connected and/or aligned position(s). The unistructural internal cavities have inherent characteristic dimensions i.e. cross-sectional configurations, which are the same or smaller than those corresponding to the positions of the articles to be aligned. The unistructural mass also has at least one separate access cavity and is deformed in such a way that the said articles can be readily inserted into the corresponding cavities with access thereto. In one embodiment, a single unistructural mass has a single bore formed by two fully aligned cavities for precision positioning of articles.

Once the articles are inserted into their corresponding cavities, the inherent memory polymer is heated above Ts in order to collapse the deformed cavities around the inserted articles and thus force the articles into a precisely defined position.

The precise shape of cavities in the IMP elements is preferably achieved by forming the three-dimensional covalent network of IMP around a position of an article to be aligned, or a duplicate thereof. Thus, the formed shape is congruent to the shape of articles in their desired mutual position at least as to one cross-sectional configuration. When the article or its duplicate, e.g. a mandrel, is removed, the corresponding cavity is formed within the memory material. The removal and the cavity enlargement is preferably achieved by swelling the memory polymer in a thermodynamically good solvent (TGS), although other enlarging methods may be used.

BRIEF DESCRIPTION OF THE DRAWINGS

The present invention is more fully understood when this specification is taken in conjunction with the appended drawings, wherein:

FIGS. 6A and 6B show nickel-titanium alloy cylinders;

FIG. 6C shows a drilled deformed truncated cylinder used in conjuction with a present invention method and FIG. 6D shows positioning of two such cylinders;

DETAILED DESCRIPTION OF INVENTION

Figure 1:
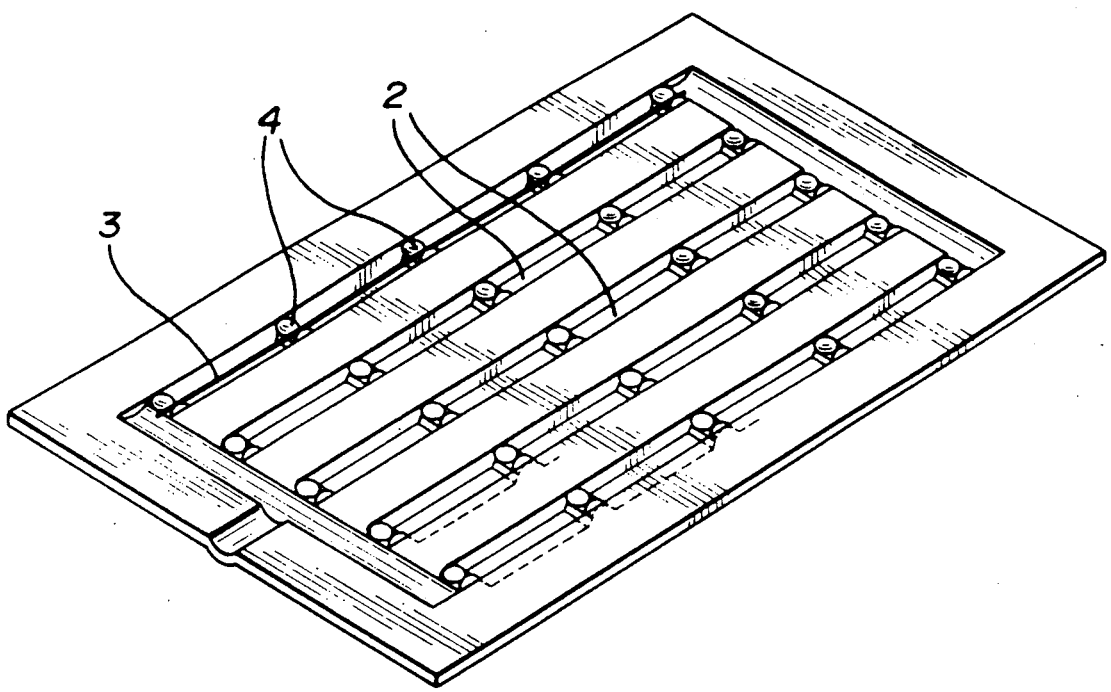
FIG. 1 illustrates a polypropylene mold with multiple rectangular cavities.

The present invention is based on finding a method by which two articles can be aligned with high precision without the aligning apparatus having any direct contact with the joint area.

The apparatus according to the invention is designed for the aligning of two or more articles of the same, similar or dissimilar shape.

"Aligning" here means that each article has defined, within itself, certain lines or axes which become a continuation of each other in the aligned configuration.

Let the direction of such lines or axes be called "axis of alignment". The axis of alignment does not necessarily imply any axis of symmetry of the articles or any correspondence of such an axis of symmetry (if any) with the axis of alignment.

Each article has a certain characteristic cross-section defined in the plane perpendicular to the said axis of alignment (which is hereinafter also called "cross-sectional configuration"). The size of the said characteristic cross-section is defined by one or more characteristic dimensions. For instance, the characteristic dimension of a cylindrical article (such as optical fiber with circular cross-sectional configuration is the outer diameter of the article; the cross-sectional configuration of a rectangular rod is a rectangle and its dimensions may be the lengths of two sides, length of one side and the length of its diagonal, and so forth.

Aligned articles may or may not be in mutual physical contact.

This rather general description is designed to describe alignment for various practical jobs where the precise mutual positioning of two articles is important, such as: connecting or splicing optical fibers; connecting tubes for fluid transport; positioning of articles for machining or assembly; contacting electrical connectors; aligning optical elements, and so on.

The aligning apparatus according to our invention comprises two or more elements of memory material having the following characteristic properties:

1) It can exist in at least two different shapes:
   (a) Inherent shape which corresponds to the state of the memory material without any internal stress. The Inherent shape is unique for each of the said elements;
   (b) Deformed shape which corresponds to the state of the memory material with internal stress. Each element can have a multitude of deformed shapes with internal stresses of different magnitudes and distributions.

2) Each memory material has a certain transition temperature, Ts, such that below such a temperature, the element is dimensionally stable in either its Inherent or Deformed shape; and above such a temperature and in the absence of any outside forces, the Deformed shape transforms spontaneously into the Inherent shape while the internal stresses tend to decrease to zero.

3) Each memory material can be deformed above its Ts by the application of an external stress from the Inherent shape to a Deformed shape or from one Deformed shape to another Deformed shape.

Each element comprises a mass of Memory Material with one or more open internal cavities which have an inherent cross-sectional configuration congruent to and equal to or smaller than the cross-sectional configuration of one of the articles to be aligned.

Cavities in all of the elements are mutually aligned in their inherent shape (i.e., each cavity in one element has at least one correspondingly aligned cavity in another element); and the correspondingly aligned cavities are mutually separated by a space filled with a fluid medium.

In this arrangement, the articles can be joined in the said fluid-filled space and thereby, can be accessible to various kinds of activities (inspection, fusing, application of adhesive, insertion of other articles in between them, and so forth). The space also forms a convenient well for an excess of adhesive, index-matching gels, etc., which cannot be otherwise easily accommodated by the tightly matching cavities.

The arrangement according to our Invention assures the alignment cf the ends of the articles which are not in any direct contact with the aligning solid surface and, in some cases, not even in any direct mutual contact.

One preferred embodiment of our invention is a method of achieving the perfect alignment of the two cavities by creating, first, a single continuous cavity in the mass of the memory material, and then creating the said space separating the two cavities by removing a part of the memory material.

If the two elements, thus created, are still interconnected by a substantial part of the original memory material, then the two cavities will stay in perfect alignment even though they are now separated by the free space.

Another preferred embodiment of our Invention is an arrangement in which said element has a multitude of cavities which are, first, in the same mutual position in each of the elements, and second, any cavity in one element can be aligned to a corresponding cavity in another element.

Then some of the cavities can be used for aligning solid continuous articles ("Aligning Pins") while others can be used for the connection and/or alignment of two or more discontinuous articles. In this way, the precise alignment of the latter (discontinuous) articles is due to their precisely defined position with respect to the aligning pins rather than due to the continuity of the memory material mass. The preferred method to create such an arrangement comprises of the formation of a single continuous mass of memory material with a multitude of parallel cavities; and then to separate the mass into a number of elements by removing part of the said memory material to separate the individual corresponding cavities by the empty space(s). If the aligning pins are used for securing the mutual position of individual elements, then the elements can be completely separated (for example by cutting the original continuous mass across the cavities) and the elements do not need to be connected by part of the original memory material mass to achieve perfect alignment.

The cavities can be made in the memory material mass by various ways, such as drilling, milling, cutting or ablation by laser beam, etc.

The preferred method of creation of the cavities is to solidify a liquid precursor of the memory material around a solid mandrel with a shape congruent to the shape of the aligned articles. The mandrel can also be the article itself or a duplicate thereof. If there is a multitude of cavities in each element, then a multitude of mandrels in each appropriate mutual position is used.

The cavities in the memory material elements are mutually aligned by originating from a single piece or block of "unistructural mass" (often even from a single molecule) of memory material formed around the mandrel. If such a mandrel(s) is removed, the corresponding empty cavity is formed within the memory material.

The size of the mandrel is selected in such a way that the cavity size in the inherent shape of the memory material is equal to or smaller than that of the corresponding aligned article.

Prior to using the aligning apparatus, the cavities in the memory material have to be deformed and enlarged to a size larger than the size of the corresponding articles as to allow their free and loose insertion into the cavities. The deformed cross-section may or may not be congruent to the corresponding inherent cross-section. For instance, the inherent octagonal cross-section can be deformed into a circular cross-section or vice versa.

The space separating two of the cavities can have various geometries and relative volumes and preferably communicates with the outside. Its size is preferably such that the distance separating both cavities is at least 50% of the cross-sectional dimension of the smaller of the cavities and not larger than 20 times the cross-sectional dimension of the larger of the cavities.

Even more preferably, the respective multiples are between 1 and 10.

The shape of the separating space may differ widely depending on the device's purpose and manufacturing method. One preferred shape is a cylindrical space with an axis approximately in a plane perpendicular to the axis of alignment.

Another preferred geometry is two cylindrical spaces with axes approximately in a right angle to each other.

Still another preferred geometry is an approximately rectangular slit with its longest sides approximately lateral to the axis of alignment.

The fluid in the separating space may be a gas (such as air), liquid, or gel. The liquid or gel can also be a precursor to a solid, for example, a curable adhesive, monomer mixture, molten wax, etc.

Devices most suitable for alignment of various articles will be described in greater detail in Examples to follow.

The term "Memory Material" was defined above. Memory materials are well known and include, inter alia, so-called "memory metals" which are certain alloys of copper, zinc and aluminum or "NITINOL", an alloy of nickel and titanium. Such alloys are described, for example, in U.S. Pat. Nos. 3,403,238 and 4,597,632 which are included by reference.

Another type of material included under the term "Memory materials" is the so-called Memory Polymers or Heat-Shrinkable Polymers (CMP) based on covalently cross-linked semicrystalline polymers, such as polyethylene or ethylenevinylacetate copolymers. These contain a portion of a crystalline phase whose melting temperature corresponds to Ts; and a portion of an amorphous phase whose glass transition temperature is at ambient temperature or lower.

The transition between the inherent and deformed shapes is carried out above the melting temperature of the polymer crystals. Such polymers are described, for instance, in U.S. Pat. Nos. 3,086,242; 3,359,193;

3,370,112; 3,597,372; 3,616,363 and 4,178,067 which are included by reference.

Preferred type of Memory Materials for our invention are Inherent memory Polymers (IMP) based on covalently crosslinked polymers whose amorphous phase has a glass transition temperature higher than ambient temperature and a melting temperature of the crystalline phase (if any) higher than the transition temperature Ts. The transition between the inherent and deformed shape or vice versa is carried out in the absence of any phase transition within the polymer.

The Ts temperature corresponds to the glass transition temperature of the amorphous phase Such polymers and their uses are described in copending U.S. patent application Ser. Nos. 07/288,628 (U.S. Pat. No. 4,888,827) and 07/464,187 which are included by reference.

A particularly preferred type of Inherent Memory Polymer are the Amorphous Memory Polymers which form a single-phase, unistructural mass as described in the above U.S. patent applications.

Inherent Memory Polymers can have a broad range of chemical compositions well known or easily established by those skilled in the art of plastics and polymers. They can be based on various polymers and copolymers with hetero-atoms in their main chain such as epoxy resins, polyarylsiloxane resins, polyurethanes, polyureas, polyesters, polycarbonates, polyamides, polyimides or polyethers.

Preferred compositions are based on polymers with a carbon main chain because of their superior resistance to degradation, precise control of crosslinking density and softening or transition temperature, and ease of manufacture. Such polymers can be based on monomers with vinyl, allyl, acryl or methacryl polymerizable double bonds. Preferred in this group are derivatives of methacrylic acid. Particularly preferred are esters of methacrylic acid and aliphatic, cycloaliphatic or aromatic alcohols, such as methanol, ethanol, isopropanol, cyclohexylalcohol, benzylalcohol, borneol, isoborneol, etc Various monomers can be combined in one polymer to achieve the desired thermomechanical, swelling, or other properties needed for a particular application.

Crosslinking of the Memory Polymers can be achieved in many ways well known to those skilled in the art. For instance, well known is crosslinking of linear or branched precursors by ionizing radiation. Another well known method is the reaction of polymeric precursors reactive with bi- or polyfunctional crosslinking agents, such as diols, diisocyanates, diepoxides diamines, and so on.

A preferred method of crosslinking is copolymerization of said vinylic, methacrylic or acrylic monomers with comonomers containing two or more copolymerizable double bonds such as bis-alkylene methacrylates, bis-alkylene acrylamides, divinylbenzene, allylmethacrylate, alkyleneglycol dimethacrylates and others. The advantages of this method are the precise control of crosslinking density and good control over residuals including residual reactive sites which could cause undesired changes of physical properties over extended periods of time.

The cavities to receive the articles for alignment can be created by many methods well known for various materials, such as drilling, cutting, burning by arc or laser beam, electrochemical etching, and so on.

A preferred method consists of the formation of the Memory Material around a suitable mandrel, which is then removed, leaving the cavity vacant. This method is particularly suitable for Memory Polymers which can be crosslinked around the mandrel, thus forming a network (in fact, a huge molecule) copying the mandrel shape with great precision.

If the crosslinking is done on a polymeric precursor, such as a polyethylene copolymer or linear polymethacrylate, the polymer can be formed around the mandrel by well known methods such as extrusion, compression molding or injection molding, and the polymer is then crosslinked in the solid state by, for example, irradiation. Also well known is Reactive Injection Molding (RIM) where a two-component mixture of a polymer precursor and a crosslinker solidifies in the mold around the mandrel. This method is suitable, for example, for polyurethanes or epoxides.

A similar method is the copolymerization of the monomer mixture, containing both the monomer and a polyfunctional crosslinking comonomer, around the mandrel; thus forming and crosslinking the polymer at the same time. This method is preferred in many cases because of its ability to copy the mandrel of very small size or complicated shape with very high precision.

The network formation around the mandrel can be carried out in the presence of solvents or plasticizers of the polymers.

The dilution of the polymer precursors or monomers, in many cases, facilitates the crosslinking (for example, radiation crosslinking of polymethacrylates) and in general, helps to control the polymerization and/or crosslinking process.

The size of the plasticized memory polymer molding can be larger than the size of the memory polymer in its inherent shape so that the mandrel can be an enlarged duplicate of the aligned article.

Once the final network is formed, the mandrel has to be removed from the cavity. One suitable method is selectively etching or dissolving the mandrel by suitable solvents or chemicals. For instance, if the memory polymer is chemically stable (for example polystyrene crosslinked by divinylbenzene) and the mandrel is made of glass or Nylon 6, then the mandrel can be etched away by hydrofluoric acid or formic acid, respectively.

The preferred method of mandrel removal is by swelling the memory polymer in a suitable solvent which expands the polymer, turns it flexible, enlarges the cavity, and cancels the adhesion between the mandrel and the Memory Polymer so that the mandrel can be readily removed.

The space separating the cavities can be created similarly to the cavities themselves, although the requirements on its precision are typically much lower.

This space can be drilled, milled, ground, sparked or etched into the memory material, or it can be made by a suitable mandrel. The space can be created into the Memory Material at any stage of the manufacturing process (for example, the primary molding after crosslinking, in the deformed state, etc.)

After the primary mandrel has been removed, the cavities must be expanded and enlarged so as to be able to freely accept the articles to be aligned. This enlargement is done by a stress acting on the memory material above its Ts. After the deformed shape has been achieved, the memory material is cooled under stress below Ts and the new deformed shape is thereby preserved until the next temperature increase above Ts.

The enlargement can be achieved by various techniques described in the prior art or in the copending applications.

The preferred method for Memory Polymers is the deformation by swelling in a thermodynamically good solvent (TGS) for the given polymer composition. The TGS achieves the depression of Ts and generates the deforming pressure (i.e. solvent swelling pressure) at the same time. Depending on the solvent, the solvent swelling depresses the glass transition temperature of the amorphous phase and/or solvates and thereby dissolves the crystalline phase (if any). The solvent then has to be removed as a stress maintains the deformation achieved by swelling. The solvent can be removed by extraction, evaporation or by a combination thereof.

Some plasticizer can be left in the memory polymer intentionally to depress its Ts and to modify its thermomechanical properties and the instantaneous inherent size. The depression of the softening temperatures of polymers by plasticizers as well as the relation between the size of the polymer and plasticizer content are well known to those skilled in the art and can be readily calculated or determined experimentally. The plasticizer can be a part of the composition permanently (for example, if its volatility is very low) or it can be slowly removed (for example, by evaporation prior to or during the function of the device). If such a plasticizer is a monomer, it can be polymerized after the cavity collapse to increase the strength, thermal resistance, and/or other properties of the memory polymer in its final functional state.

The pressure maintaining the deformation can be a fluid pressure inside the cavity or mechanical pressure due to a mandrel inverted into the enlarged, swollen cavity prior to solvent removal. Once the solvent is removed, the Ts of the memory polymer increases above ambient temperature and the stress in the memory polymer is preserved even after the deformation-maintaining stress is removed (for example, the secondary solid mandrel was removed from the enlarged cavity).

Once the cavities are solidified or vitrified in their deformed and enlarged cross-sectional configuration and the mandrels are removed from their cavities, the device is substantially ready for its function.

The alignment method according to our invention consists of the following essential steps:

1) The solid articles to be aligned are inserted into the corresponding deformed cavities as far as to reach the said separating space. The articles may or may not be in mutual contact, depending on the goal of the aligning procedure.

2) Memory material is heated above its transition temperature, Ts (which is the lowest theoretical temperature at which the memory material can return from its deformed to its inherent shape in the absence of external forces).

Return of the cavities from their deformed to inherent cross-sectional configurations aligns the articles, including their parts inside the separating space which are not in direct contact with the memory material.

3) Memory material is cooled down below Ts, thereby solidifying and fixing the articles in their aligned positions.

4) The aligned articles are now ready for additional operations such as welding or fusing the articles; replacing the fluid in the separating space for a curable adhesive, embedding and sealing the aligned articles; inspecting quality of alignment and/or connection; etc.

As the cavities collapse around the inserted articles, we may either want them completely immobilized or keep them aligned but movable.

In the former case, it is advantageous if the memory material has a larger coefficient of thermal expansion than the material of the aligned articles. The contraction by cooling between the Ts and the final temperature (for example, ambient) will be then larger for the cavity than for the article, and the article will be held in place by the normal pressure of the memory material.

In the latter case, it is advantageous to select a memory material with a thermal contraction in the solid state somewhat smaller than that of the aligned articles over the same temperature interval. Then, a minute separation will develop between the article and the cavity walls which will facilitate the movement.

If the article(s) should stay mobile, it is preferred that the space separating the article(s) from the walls be filled by a viscous, lubricating fluid. This can be achieved by filling the cavities with such a lubricating medium prior to or during the cavity collapse. The retraction force cannot expel the medium of finite viscosity completely from the narrow space between the cavity wall and the article, particularly if the said medium wets either one or both of the surfaces well. A layer of the medium of a thin, but nevertheless finite, thickness will remain between the cavity wall and the article.

Then the separation and the mutual restricted mobility can be achieved regardless of the thermal expansion coefficient of either material and does not cause any detectable deterioration of the alignment.

Depending upon the selection of the memory materials and/or lubricants, one, both, or none of the aligned articles may stay mobile.

The space separating the aligned cavities can be used for various functions or operations. For example, it can be used to access the joint between the aligned articles in order to fuse or weld them together, securing their alignment permanently.

The separating space can also be filled with a curable adhesive to achieve the same result.

It can also be used as a well for any excess of adhesive, index-matching, sealing, lubricating, or conductive medium which may be required for the intended function.

It can also be used for the insertion of another article working in cooperation with the said aligned articles, such as a detector, an optical element, an electrical element, etc.

Some of the possibilities and functions are described in the following non-limiting Examples.

EXAMPLE 1

This example illustrates a basic arrangement using an inherent shape memory polymer for optical fiber splicing in a device which utilizes the separating space for the removal of debris between the fiber ends and for the application of an index-matching gel to the ends of the spliced fibers. It also illustrates the basic techniques for the deformation of the cavities by solvent swelling.

A monomer mixture containing 96.8% MethylMethacrylate (MMA) 3.0% Tetraethyleneglycol diMethacrylate (TEGDMA) and 0.2% benzoin was filled into polypropylene multiple molds with vacuum-formed rectangular cavities as depicted in FIG. 1.

Individual cavities 2 are organized into parallel rows.

Glass fiber 3 of diameter 110 microns was inserted into the molds and secured in the partitions 4 between cavities by melting the polypropylene with the point of a soldering iron. Once filled with the monomer mixture, the mold was overlayed by a flat polypropylene sheet which was secured to the mold by welding at the edges.

The monomers were polymerized by a UV lamp at 25 degrees C. for two hours; then at 70 degrees for two hours; and finally at 110 degrees C. for three hours. Thus, the polymerization was carried out to very high conversion. Shore D hardness of the polymer was over 90 at ambient temperature.

The moldings were removed from the molds and their ends were milled to form faces sloped in an angle of about 45 degrees.

Then, a hole of diameter 0.75 mm was drilled through the polymer mass to bisect the embedded glass fiber in half.

The memory polymer piece was then exposed to vapors of boiling toluene in order to swell the polymer. Once sufficiently plasticized to the point of becoming rubbery, they were soaked by immersion in Ethoxy Ethyl Acetate overnight. The two sections of glass fiber were replaced by a continuous Nylon fiber of diameter 0.140 mm.

The Ethoxy Ethyl Acetate was then gradually replaced by methanol, was dried out first at 65 degrees C. and then at 110 degrees C. to the point of achieving a constant weight of the polymer piece. The hardness of the polymer returned to above 90 on the Shore D scale and its softening temperature was between 98 and 104 degrees C.

Figure 2:
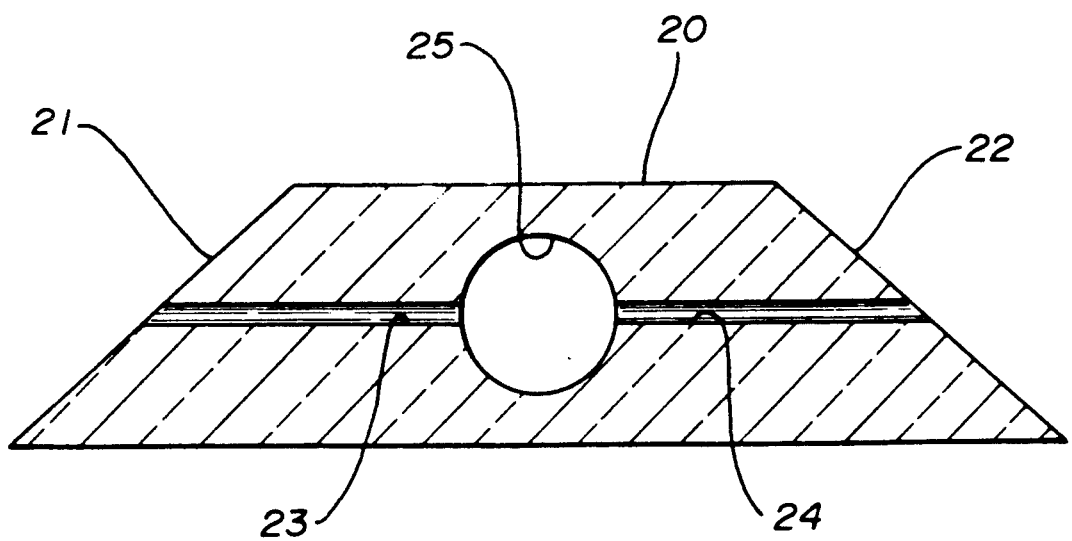
FIG. 2 illustrates a side cut view of a present invention alignment device with access means which was made with the mold of FIG. 1.

The Nylon fiber was then cut off inside the cylindrical separation space by a tubular cutter of about 0.7 mm in diameter. The two sections of Nylon fiber were then readily pulled out of the cavities. The resulting device is in FIG. 2 where 20 is the body of the PMMA-based memory polymer; 21 and 22 are sloped ends of the device; aligned cavities 23 and 24 are two cavities deformed and enlarged to loosely receive optical fibers of standard diameter 125 microns; the cylindrical access cavity 25 intersects and separates aligned cavities 23 and 24.

Denuded, cleaved ends of standard optical fiber were inserted into the cavities until they slightly touched, approximately in the middle of the separating space.

As usual during such a procedure, sharp edges of the cleaved glass fiber scraped some material from the cavity wall and pushed it in front of the fiber ends until they reached the separating space. There, the scrapings were shed into the separating space and the fiber ends achieved clean, unobstructed contact. The separating space, in this case, functions as a well for the collection of scrapings and other debris which may otherwise prevent a clean contact in memory devices using a single continuous cavity.

The assembly was then heated with a heat gun, air temperature about 125 degrees C., for about 60 seconds. Upon cooling, the collapsing cavities achieved perfect alignment of the fibers within the separating space and a tight grip on the adjacent sections of the fiber within the cavities. The connection was then inspected under a microscope and an index matching gel was then injected into the separating space by a syringe with a 22 Gauge needle. Insertion loss below 0.1 dB was maintained between −40 and +80 degrees C.

EXAMPLE 2

This combined example shows a use of an inherent memory polymer device for a renewable connection between two optical fibers.

Several features are combined in this one example:

a) Polymerization and crosslinking of the memory polymer in the presence of diluents;

b) Use of a plasticizer in the memory polymer to modify its thermomechanical properties (Ts depression);

c) Use of a memory material with two softening temperatures (low Ts for cavity collapse and high Ts for service life);

d) Use of an aligning pin for the improvement of the alignment and for the guidance of the optical fiber into the cavity;

e) Differentiated collapse of the two cavities by collapsing one of them in the presence of a lubricating liquid.

A monomer mixture containing 0.375% of ethyleneglycol dimethacrylate, 74.625% of ethylmethacrylate, 24.8% of toluene and 0.20% of dibenzoylperoxide is briefly purged with nitrogen and then degassed by brief application of a vacuum provided by a water ejector pump.

Figure 3A:
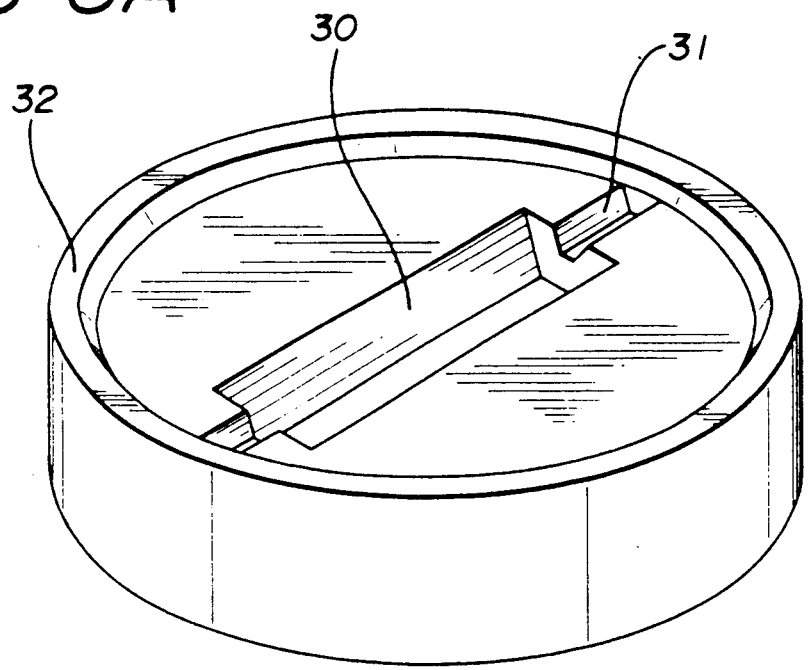
FIG. 3A illustrates a bottom portion of a polypropylene, two-part mold used in the method of making a present invention device
Figure 3B:
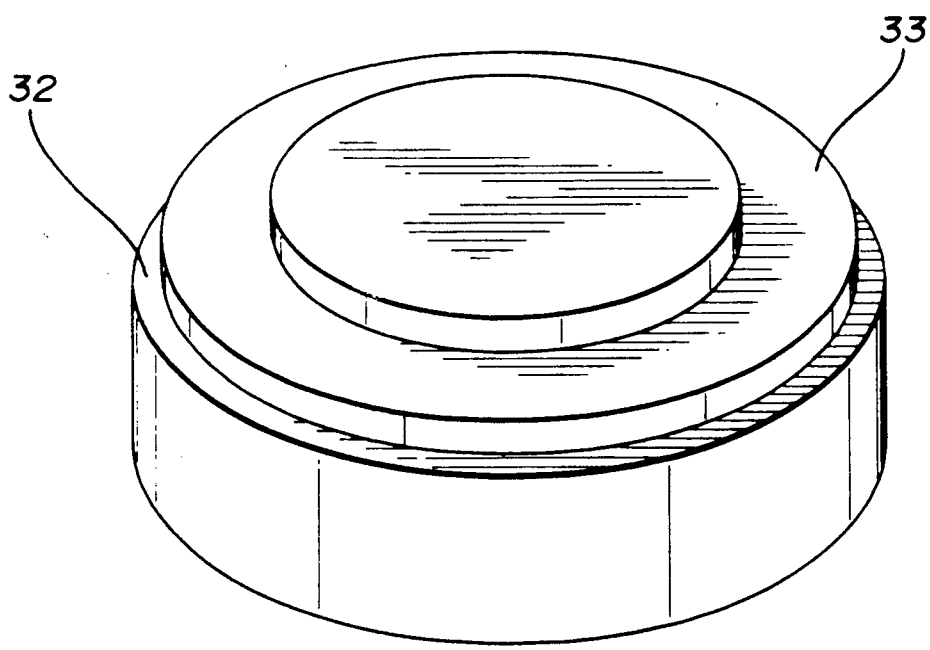
FIG. 3B shows its top portion.

Polypropylene, two-part mold is made by injection molding. The bottom part of the mold containing a substantially rectangular cavity 30, slit 31 for holding mandrels and circular rim 32 is depicted in FIG. 3A. The top part of the mold with circular part 33 fitting into the rim 32 is in FIG. 3B.

Two denuded optical fibers of diameter 125 microns are inserted into slit 31 in such a way that they are in intimate contact along their whole length (they stick together due to electrostatic forces after being rubbed with an organic cleaning solvent).

Then the bottom part of the mold is filled with the monomer mixture and the top part of mold is pressed into it to achieve tight closure. The filled molds are placed in a pressure vessel which is then purged and pressurized with nitrogen to 1 atm of internal pressure. The vessel is then placed into an oven and kept there at 65 degrees C. for 16 hours.

The vessel is then cooled, opened, and the plastic moldings are removed from the molds.

The crosslinked polyethylmethacrylate moldings, which are plasticized with the toluene to a somewhat rubbery consistency at this stage, are swollen in toluene. The glass fibers are removed from the enlarged cavities. The opposite ends of the moldings are cut in an approximately 45 degree angle and two perpendicular holes are cut into the swollen material by a circular cutter of 2 mm in diameter (the cutter is a sharpened stainless steel tube).

Both holes bisect both cavities and their overlap forms a space dividing the originally continuous cavities into two pairs of cavities separated by a free space. Each of the four cavities, thus formed, is parallel to one adjacent cavity and perpendicular to another cavity.

Nylon fibers of diameter about 0.145 mm are inserted into the cavities and the moldings are separated into two groups:

A) Precursor devices in group A are gradually deswollen in isopropanol, ethanol and methanol and then dried at 65 degrees C. and subsequently at 110 degrees C. to a constant weight.

The memory polymer at this point has a Shore D hardness of about 82 at ambient temperature and a Ts of about 65 degrees C.

If the Nylon mandrels are removed, the cavity's diameter is between 140 and 145 microns. If the memory polymer is heated for 5 minutes at 100 degrees C. (in boiling water), the cavity diameter shrinks to about 111 microns. This is considered the inherent cavity diameter for this copolymer.

Figure 4A:
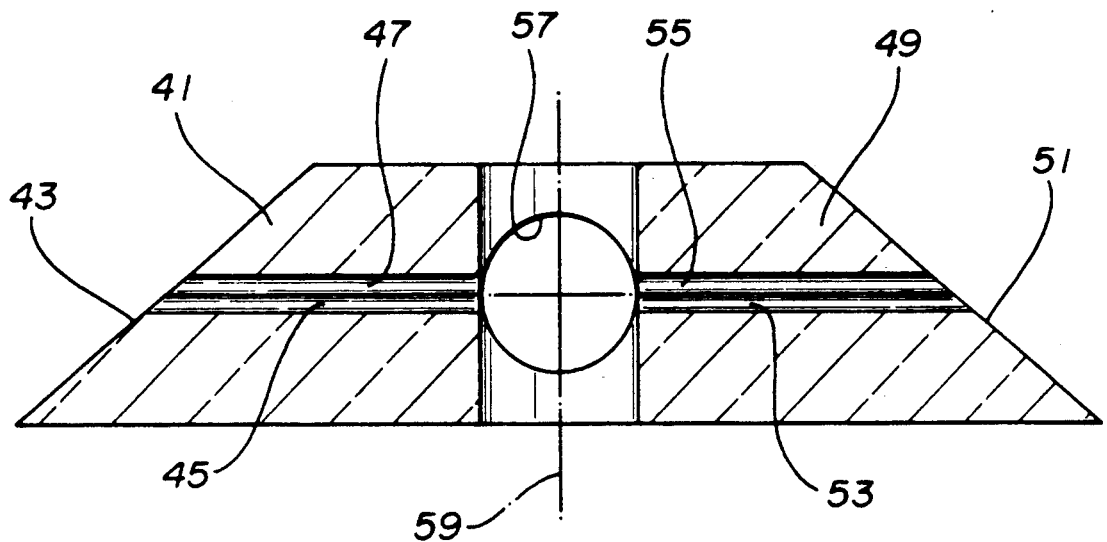
FIG. 4A illustrates a side cut view of a present invention alignment device having two access cavities intersecting at right angles to one another and at right angles to the alignment cavities and FIG. 4B illustrates a cut end view thereof.

The device is depicted in FIG. 4A from a side view where 41 is one segment of the memory polymer with sloped face 43, one alignment cavity 45 and another parallel alignment cavity 47.

49 is the second segment of the memory material with sloped face 51 and two parallel cavities 53 and 55.

The aligned cavities 45 and 53 and aligned cavities 47 and 55 are separated by access cavity 57.

Figure 4B:
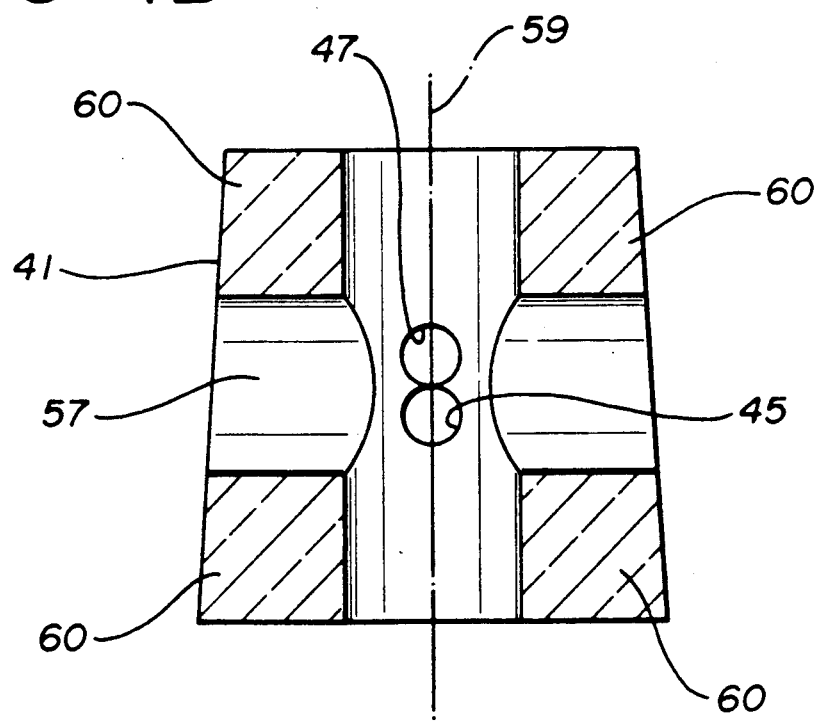

FIG. 4B shows segment 41 from the direction of cross-section 59 of FIG. 4A where 45 and 47 are parallel cavities and 60 is the memory polymer connecting segments 41 and 49.

Nylon mandrels are not shown in either view.

The Nylon mandrel is cut off inside the separating space 57, and in the cavities 45 and 53 is replaced by a continuous piece of optical fiber of diameter 125 microns. While the Nylon mandrel is kept in cavities 47 and 55, the memory polymer is heated for 5 minutes at 100 degrees C. and cooled down.

Nylon mandrels are then pulled out of the cavities 47 and 55.

Figure 5A:
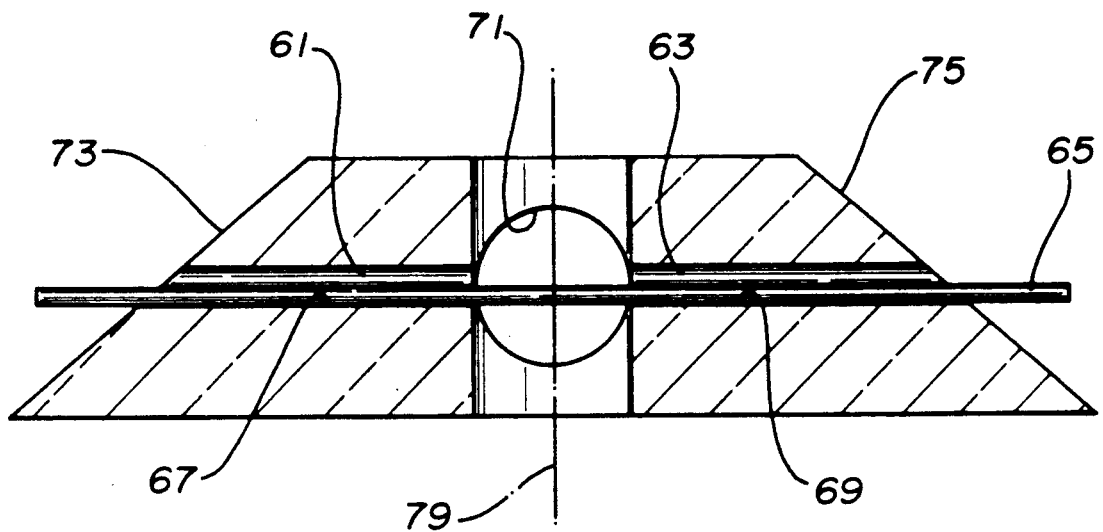
FIGS. 5A and 5B show a side cut view and an end cut view of the present invention device described above but now including an alignment glass fiber.
Figure 5B:
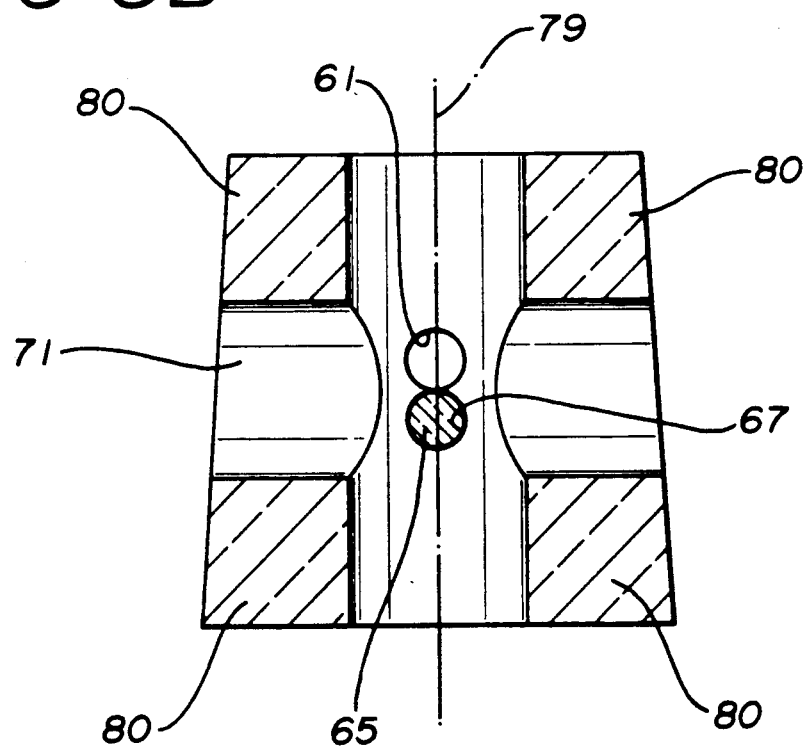

The configuration of the device at this stage is depicted in FIG. 5A, where 61 and 63 are empty cavities deformed from inherent diameter 111 microns to deformed diameter 140 to 145 microns. Glass fiber 65 is firmly enclosed in collapsed cavities 67 and 69 and traverses through the empty space 71. Short lengths of the fiber 65 protrude from the sloped faces 73 and 75. The cross section defined by line 79 is depicted in FIG. 5B, where 61 is the empty deformed cavity; 65 is the continuous glass pin; 67 is the collapsed cavity; 71 is the separating space; Memory polymer elements are interconnected by polymer material 80.

B) Precursor devices are soaked in an excess of a mixture containing 37.5% isobornylmethacrylate, 12.4% ethyleneglycol dimethacrylate, 0.1% benzoin and 50% methanol. The devices were taken out after 48 hours and evaporated under vacuum until the liquid content was about 21% of the swollen composition. The composition was rigid at ambient temperature and softens at about 35 to 40 degrees C. This was the Ts of the plasticized memory polymer. If heated to 50 degrees C. for 5 minutes in the absence of mandrels, the cavities collapsed from the original 140-145 microns to about 120.5 microns. This was considered the inherent cavity diameter for the plasticized memory polymer. The Shore D hardness was about 50 at low temperature.

The precursor was processed in the same way as the samples of Group A to yield a device similar to FIG. 5A, however, of a slightly larger size (each linear dimension was about 9% larger due to the plasticizer content).

The devices can be used in many ways for the connection of optical fibers. Several ways, illustrative of the effect of the curable plasticizer in Group B, are described here.

1) Use as an optical fiber splicer

Denuded, cleaved ends of optical fibers are inserted into the cavities 61 and 63 until they meet in the separating space 71. The protruding ends of the glass aligning pins help to guide the fibers smoothly into the cavities. It can be observed that the softer material in the group B is less prone to generating debris due to scraping the memory polymer by the sharp cleaved ends of the glass fiber. In either case, the problem is not serious because the debris is readily shed from the fiber end once the fibers reach the empty space 71.

The splicers are heated above their respective transition temperature Ts (65 and 35 for groups A and B, respectively) until the cavities collapse around the optical fiber. The optical fiber ends are precisely aligned due both to the inherent aligned positions of the cavities and the adjacent aligning pins. The splice in this form can serve as a dry splice with moderate insertion loss (0.2-0.3 dB) but without the thermal stability required for many uses.

Index-matching, UV-curable adhesive (Loctite Lite-Tak) is injected into the space 71 and the splice is exposed to UV light for about 30 seconds. The insertion loss decreased below 0.1 dB and the thermal stability increased considerably.

Splices from Group A are more stable because of the cured adhesive inside the cavity, but the memory material itself still has a softening temperature of about 65 degrees C. It can be deformed by outside stresses above this temperature and the splice can be damaged under such conditions.

Conversely, splices from Group B increase their hardness to a value over 95 on the Shore D scale and cannot be deformed even at temperatures as high as 150 degrees C.

Experiments with splices collapsed without optical fiber show that UV curing decreases the inherent cavity diameter from the original 120-121 microns to about 118-119 microns. This curing contraction increases the holding power on the spliced fiber considerably.

2) Use as an optical fiber connector

The Nylon mandrel is pulled out of the one cavity 61 only (while the other is left in 63) and is replaced by a denuded optical fiber with a polished end. The cavities are then collapsed by the application of heat as described above. After cooling, the separating space is filled with a silicone-based lubricating gel and the nylon mandrel is slowly pulled out of the cavity 63. The gel now partly fills the cavity 63. Subsequently, another glass fiber of diameter 125 microns with a cleaved and polished end is dipped into the lubricating gel and inserted into the cavity 63.

The splices are then heat-treated to collapse the cavity 63 as described above. However, in this case the gel lubricates the contact between the fiber and cavity 63 wall so that the fiber can be moved or rotated along the cavity axis. Splices from Group B are UV-cured for 30 minutes to complete the procedure.

The fiber in cavity 63 can be removed and readily reinserted or replaced by another piece of the same grade of optical fiber. In each case, the newly inserted fiber meets the end of the fiber firmly embedded in cavity 61 in precise alignment and a low-loss connection results.

The lubricating gel in the space 71 may be replaced from time to time to remove accumulated debris (if any).

The connectors from group B have much better thermal stability, retention power for the fixed fiber, and resistance to wear from repeated connections. One reason for the higher abrasion resistance is the generally higher hardness. The second probable reason is likely due to the different character of the scraped debris (microscopic powder-like debris in Group B vs. longer shaving-like debris in Group A). The advantage of the described connector vs. a typical connector with a ferrule is that the alignment, in our case, is derived directly from the fiber surface (its contact with the cavity wall and with the adjacent aligning pin) rather than indirectly from the ferrule surface (which has to rely on the fiber-ferrule surface alignment).

The use of a UV-curable plasticizer illustrated on the methacrylate-based amorphous, inherent shape memory polymer is even more useful in connection with older crystalline memory polymers which have Tgs of the amorphous phase lower than ambient temperature. The UV-cured monomer/plasticizer forms a highly cross-linked inter-penetrating network with improved mechanical properties and higher thermal stability.

EXAMPLE 3

This example illustrates a combination of a design and manufacturing method on a device made of a memory alloy. The same techniques and designs can also be utilized in connection with memory polymers.

Cylindrical piece 201 of Ni-Ti alloy described in U.S. Pat. No. 4,261,644 is machined to have a 10 mm diameter and 10 mm length as depicted in FIG. 6A.

It is then heated above its transition temperature and compressed to decrease its length to 5 mm; the deformed cylinder is cooled under pressure. It has the form approximated by 203 in FIG. 6B with a 14 mm diameter and 5 mm length.

In FIG. 6C, hole 81 of diameter 0.175 mm is drilled through the axis of the cylinder. Two other holes 82, 83 of diameter 1.40 mm are drilled parallel to the first hole in mid-distance between the axis of hole 81 and the edge of the cylinder, 180 degrees apart. The major part of the cylinder 84 is milled off.

The part is then cut perpendicularly to the axis to form two symmetrical parts 85 and 87 as depicted in FIG. 6D.

Figure 7:
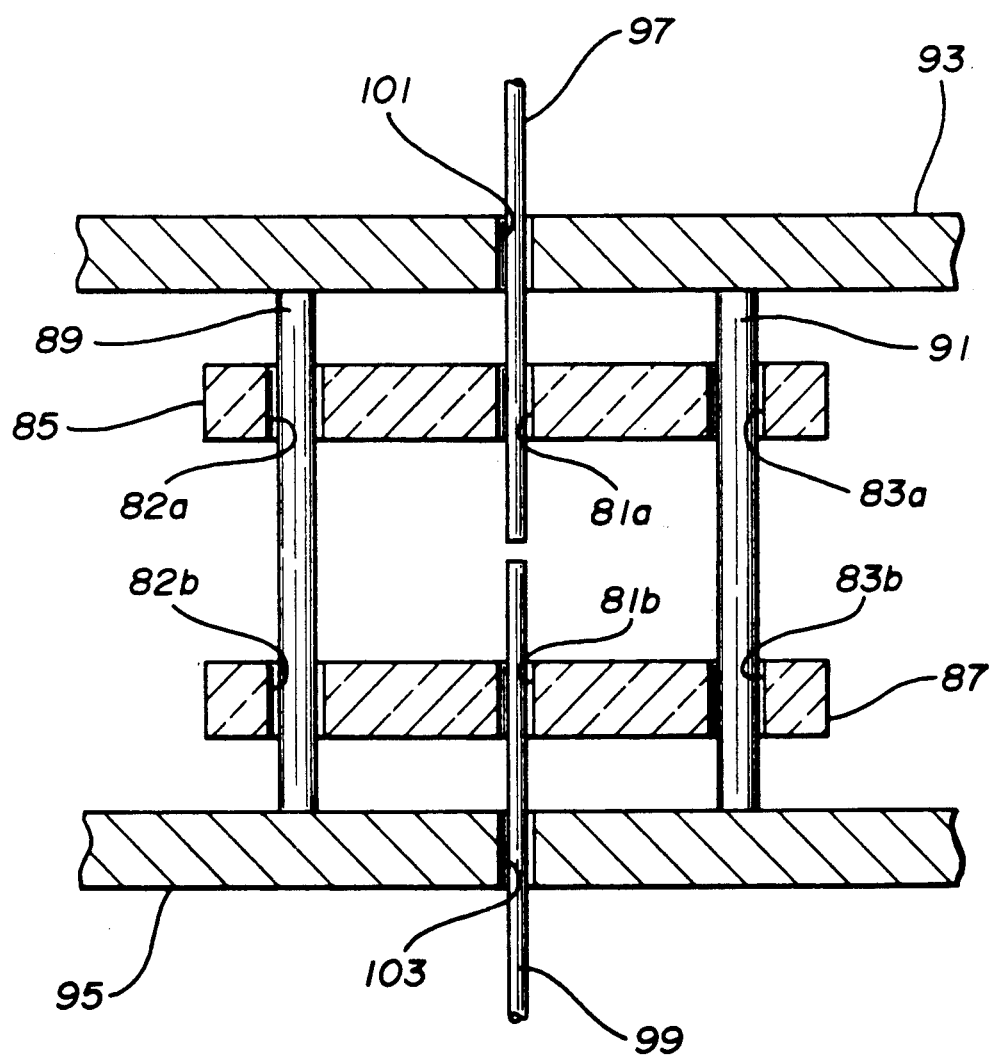
FIG. 7 shows a side cut view of the FIG. 6D cylinders and an alignment device used in conjunction with the alignment device of the present invention.

The device can then be used for the alignment of two optical fibers in the following manner:

Two precision ground steel cylindrical pins 89 and 91 of diameter 1.00 mm and length 12.5 mm are inserted through the holes 82a, 82b, 83a and 83b (filled with a heat-resistant lubricating gel) of the part 85 and 87 as depicted in FIG. 7. Base plates 93, 95 support the assembly. Cleaved optical fibers 97, 99 are inserted through guiding holes 101, 103 in the base plates 93 and 95 and through the lubricating gel-filled holes 81a and 81b until they are in contact.

The memory alloy is then heated above its transition temperature so as to collapse around the pins 89 and 91 and around the fibers 97 and 99. The fibers are now aligned and mobile so that their mutual position can be adjusted. The easy access to their joint can be utilized for fusion of the fiber ends.

EXAMPLE 4

This example illustrates the use of an IMP device for precise alignment of two glass or metal tubes or capillaries, while allowing access to the interface for further mechanical operations.

Figure 8:
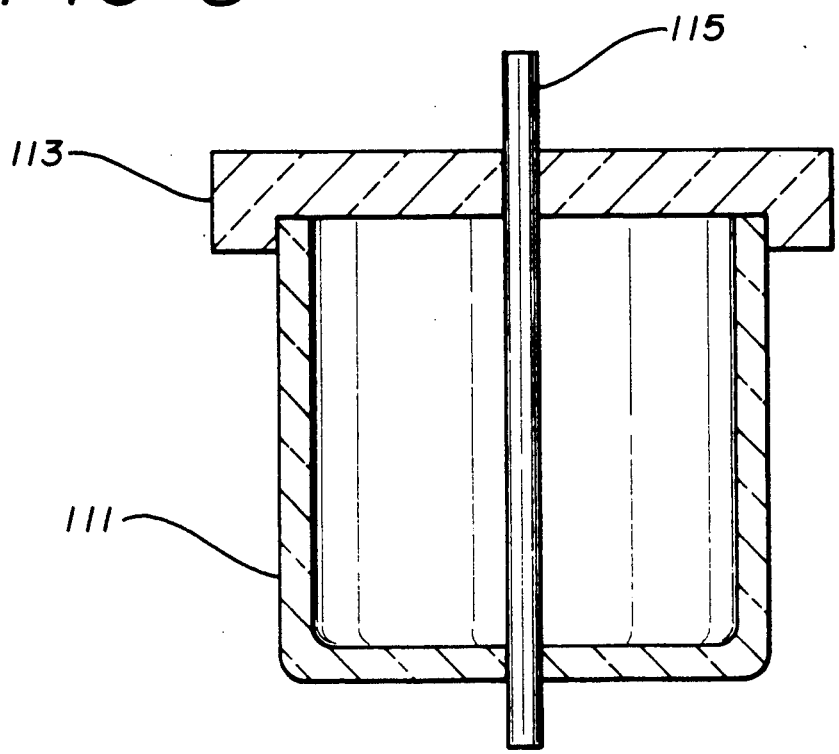
FIG. 8 shows a side cut view of a mold used in one step of the formation of an alignment davice of the present invention.

A monomer mixture containing 96.95% Methylmethacrylate (MMA), 3.0% Tetraethyleneglycol diMethacrylate (TEGDMA) and 0.05% benzoyl peroxide is filled into a cylindrical polypropylene mold as depicted by FIG. 8, where 111 is the mold body, 113 is the mold lid, 115 is a stainless steel cylinder of 2.5 mm in diameter which extends through and is sealed to the bottom of the mold body and the mold lid.

The molds are placed in an oven at 70° C. for 12 hours and then 120° C. for two hours.

The lid is removed from the mold body and the molding is removed and swollen according to the method of Example 1. After the memory polymer material is fully swollen, the stainless steel mandrel is removed and replaced by a nylon mandrel of 3.5 mm in diameter. The memory polymer is then deswollen and dried as described in Example 1.

Once dried, a 5 mm diameter hole is drilled through the memory polymer piece, perpendicular to the nylon mandrel, cutting the mandrel in half.

Figure 9:
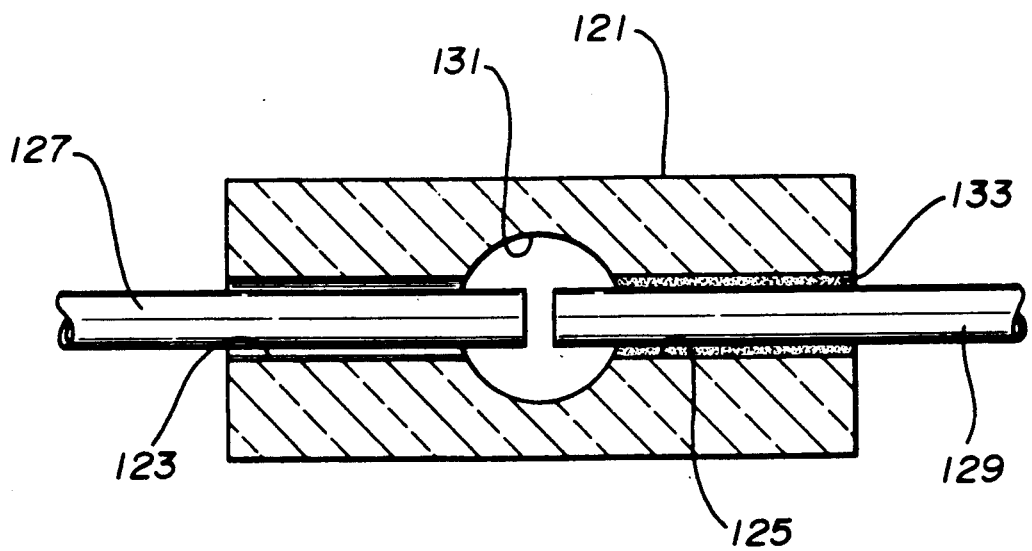
FIG. 9 illustrates an alernative embodiment of the present invention alignment device having a single access hole for alignment of two articles which do not come in contact with one another.

The device is now ready for aligning jobs of tubes and/or cylinders ranging from 2.75 to 3.25 mm in diameter. For example, consider two glass tubes with an outside diameter of 3 mm and a wall thickness of 0.5 mm. As illustrated by FIG. 9, glass tube 127 is inserted into cavity 123 of memory polymer piece 121 until the end of the tube is in the middle of space 131. Heat resistant lubricating gel 133 is deposited on the walls of cavity 125 in memory polymer piece 121. Glass tube 129 is then inserted into cavity 125 until the end of tube 129 is in the middle of space 131 and in contact with the end of tube 127 (alternatively, the gel may be deposited on the outside of the glass tube prior to the tubes insertion into the cavity). The memory polymer piece is heated to 120° C. for 60 seconds with a commercially available temperature controlled heat gun. Sixty seconds after the heating, the memory polymer has recovered about both glass tubes, fixing 127 in place and allowing 129 to move axially but with 129 in perfect coaxial alignment with 127. Glass tube 129 can now be rapidly rotated and pressed to 127, welding the two capillaries precisely by friction.

Alternatively, lubricating gel can be applied to both cavities 127 and 129, therefore allowing free movement of the tubes about and along the central axes of the cavities. In this way, both tubes and/or cylinders may be rotated coaxially within the memory polymer piece, the interface accessible for welding the glass with a flame or welding metal capillaries with an electric arc.

What is claimed is:
1. A device for precision alignment of two or more articles with the device permitting access to said articles, which comprises:
a unistructural mass of inherent shape memory material having three dimensions and having at least two cavity-containing ends which include a first cavity at one of said cavity-containing ends formed into the inside of said mass, and a second cavity at another of said cavity-containing ends formed into the inside of said mass to and in a predetermined alignment with said first cavity and at least one separate access cavity formed into said mass and intersecting with at least one of said first or second cavity, said mass having a first shape and a second shape:
  (a) said first shape being a unique, recoverable, predetermined inherent shape wherein said first cavity and said second cavity each have a preset cross-sectional configuration to accommodate and tightly hold at least a portion of articles to be aligned with one another; and,
  (b) said second shape being a deformed and enlarged shape of said inherent memory material wherein said first cavity and said second cavity each have an enlarged predetermined cross-sectional configuration greater than the cross-sectional configurations of the portions of the articles to be held so as to loosely and freely receive said portions of said articles;
  said mass of inherent shape memory material being in said second shape and being capable of being returned to said first shape for precision alignment of said two or more articles by application of a non-mechanical stimulus to said mass.

2. The device of claim 1 wherein said inherent shape memory material is a memory metal material.

3. The device of claim 1 wherein said inherent shape memory material is a memory polymer material.

4. The device of claim 3 wherein said mass of inherent shape memory polymer material has been initially formed in said first shape, then swollen, then partially shrunk to said second shape for subsequent return to said first shape by application of a non-mechanical stimulus thereto.

5. The device of claim 4 wherein said swelling is by solvent swelling.

6. The device of claim 3 wherein the said unistructural mass is crosslinked amorphous organic polymer with a glass transition temperature higher than 25 degrees C. but lower than 200 degrees C.

7. The device of claim 6 wherein the said amorphous crosslinked polymer has a glass transition temperature between 50 degrees C. and 150 degrees C.

8. The device of claim 6 wherein the said amorphous crosslinked polymer consists of at least one monomer selected from derivatives of acrylic acid, methacrylic acid and styrene.

9. The device of claim 8 wherein the said derivatives is ester of methacrylic acid and alcohol with one to ten carbon atoms.

10. The device of claim 1 wherein said separate access cavity intersects both of said first cavity and said second cavity.

11. The device of claim 10 wherein said separate access cavity intersects both of said first cavity and said second cavity at right angles.

12. The device of claim 1 wherein said separate access cavity intersects at least one of said first and said second cavities at a right angle.

13. The method of claim 1 wherein said device contains at least one aligning pin.

14. The device of claim 1 wherein a plurality of cavity-containing ends in excess of two cavities are included, and each contains at least one cavity for receiving at least a portion of an article to be aligned, for precision alignment of more than two articles.

15. The device of claim 1 wherein said cavities are formed such that the articles are not in direct contact with one another when held by said device upon return to said first shape.

16. The device of claim 1 wherein said first cavity and said second cavity contain central axes which are in linear alignment with one another.

17. The device of claim 16 wherein said separate access cavity intersects both of said first cavity and said second cavity.

18. The device of claim 16 wherein said separate access cavity intersects at least one of said first and said second cavities at a right angle.

19. The device of claim 18 wherein said separate access cavity intersects both of said first cavity and said second cavity at right angles.

20. The device of claim 1 wherein said first cavity and said second cavity contain central axes which are not linearly aligned with one another.

21. The device of claim 20 wherein said separate access cavity intersects at least one of said first and second cavities at a right angle.

22. The device of claim 21 wherein said separate access cavity intersects both of said first cavity and said second cavity at right angles.

23. The device of claim 20 wherein said separate access cavity intersects both of said first cavity and said second cavity.

24. The device of claim 1 wherein said unistructural mass has a shape which is asymmetrical.

25. The device of claim 1 wherein said unistructural mass is trapezoidal and the largest of its rectangular faces is about parallel to the central axes of said cavities.

26. A method of preparing a device for precise positioning of one or more solid articles which comprises:
  (a) forming a substantially amorphous covalently crosslinked polymer mass around a solid mandrel which has at least one cross-sectional configuration congruent to at least one cross-sectional configuration of said articles so as to create a cavity therethrough and removing the mandrel therefrom;
  (b) forming a separate access cavity into said mass so as to intersect said cavity;
  (c) deforming the said mass so that the cavity formed around the said mandrel has said cross-sectional configuration enlarged as to freely and loosely accept at least a portion of said article;
  (d) solidifying (vitrifying) the said polymer mass in a shape corresponding to the said enlarged cross-sectional configuration.

27. The method of claim 26 wherein said formation of crosslinked amorphous mass is accomplished by polymerization of mixture of bi-functional monomers or reactive polymer precursors.

28. The method of claim 27 wherein crosslinking is accomplished in the presence of liquid plastifying the said polymer mass.

29. The method of claim 26 wherein said formation is accomplished by crosslinking of a linear polymer precursor.

30. The method of claim 29 wherein crosslinking is accomplished in the presence of liquid plastifying the said polymer mass.

31. The method of claim 26 wherein said deformation of the said polymer mass is accomplished by pressure at temperature higher than softening temperature of said polymer mass.

32. The method of claim 31 wherein said deformation is accomplished in the presence of such concentration of a thermodynamically good solvent in the said polymer that the said polymer mass has a softening temperature which is depressed below ambient temperature.

33. The method of claim 32 wherein said solvent concentration is equilibrium concentration in said polymer at a temperature of the said deformation.

34. The method of claim 31 wherein said pressure is swelling pressure of thermodynamically good solvent of said polymer.

35. The method of claim 26 wherein said solidification (vitrification) is achieved by polymerization of reactive plasticizer.

36. The method of claim 26 wherein said solidification (vitrification) of the said polymer mass is under stress so as to maintain said deformed cross-sectional configuration.

37. The method of claim 36 wherein said solidification (vitrification) is achieved by removal of plasticizing solvent.

38. The method of claim 36 wherein said stress is achieved by inserting a mandrel with at least one cross-sectional configuration which is larger than the cross-sectional configuration of said article into the said cavity prior to the removal of solvent.

39. The method of claim 26 wherein said separate access cavity intersects both of said first cavity and said second cavity.

40. The method of claim 39 wherein said separate access cavity intersects both of said first cavity and said second cavity at right angles.

41. The method of claim 26 wherein said separate access cavity intersects at least one of said first and said second cavities at a right angle.

42. A method of preparing a device for precision alignment of two or more articles which comprises:
  (a) polymerizing a monomer mixture of inherent shape memory polymer so as to create a unistructural mass having three dimensions and having at least two cavity containing ends which include at least a first cavity at one of said cavity-containing ends into the inside of said mass, and a second cavity at another of said cavity-containing ends into the inside of said mass to and in a predetermined alignment with said first cavity, each of said cavities having a predetermined cross-sectional configuration equal to or less than the cross-sectional configuration of at least a portion of articles to be aligned;
  (b) forming a separate access cavity into said mass by any available technique so as to intersect at least one of said first and second cavities;
  (c) swelling the inherent shape memory polymer to an enlarged size such that each of said cavities has an enlarged cross-sectional configuration which is greater than the cross-sectional configuration of a portion of said articles to be aligned;
  (d) partially shrinking the swollen inherent shape memory polymer by solvent removal to a deformed shape such that each of said cavities has a predetermined cross-sectional configuration which is less than the fully swollen cross-sectional configuration but nonetheless greater than the cross-section configuration of the portions of said articles to be aligned.

43. The method of claim 42 wherein said polymerizing is carried out to create said unistructural mass by being reacted about portions of one or more select articles to be aligned or duplicates thereof.

44. The method of claim 43 wherein said swelling is performed by soaking in one or more thermodynamically good solvents.

45. The product resulting from the method of claim 44.

46. The method of claim 43 wherein, after said swelling, at least one slightly enlarged duplicate of a portion of an article to be aligned is inserted into said cavities and then said shrinking is performed while said slightly enlarged duplicate is inserted, and further wherein said slightly enlarged duplicate is removed after said shrinking.

47. The product resulting from the method of claim 46.

48. The product resulting from the method of claim 43.

49. The method of claim 42 wherein swelling is performed by soaking in one or more thermodynamically good solvents.

50. The method of claim 49 wherein, after said swelling, at least one slightly enlarged duplicate of a portion of an article to be aligned is inserted into said cavities and then said shrinking is performed while slightly enlarged duplicate is inserted, and further wherein said slightly enlarged duplicate is removed after said shrinking.

51. The product resulting from the method of claim 50.

52. The product resulting from the method of claim 49.

53. The method of claim 42 wherein, after said swelling, at least one slightly enlarged duplicate of a portion of an article to be aligned is inserted into said cavities and then said shrinking is performed while said slightly enlarged duplicate is inserted, and further wherein said slightly enlarged duplicate is removed after said shrinking.

54. The product resulting from the method of claim 53.

55. The method of claim 42 wherein said monomer mixture is selected from derivatives of acrylic acid and methacrylic acids.

56. The product resulting from the method of claim 55.

57. The method of claim 55 wherein said derivatives are esters of alcohols.

58. The product resulting from the method of claim 57.

59. The method of claim 57 wherein said alcohols have 1 to 10 carbon atoms.

60. The product resulting from the method of claim 59.

61. The method of claim 59 wherein said monomer mixture includes methylmethacrylate and butylmethacrylate.

62. The product resulting from the method of claim 61.

63. The product resulting from the method of claim 42.

* * * * *